(12) United States Patent
Christmann

(10) Patent No.: US 9,488,459 B2
(45) Date of Patent: Nov. 8, 2016

(54) POSITION SENSOR MODULE

(75) Inventor: Ralf Christmann, Kaiserslautern (DE)

(73) Assignee: BorgWarner Inc., Auburn Hills, MI (US)

( * ) Notice: Subject to any disclaimer, the term of this patent is extended or adjusted under 35 U.S.C. 154(b) by 402 days.

(21) Appl. No.: 14/124,766

(22) PCT Filed: Jun. 20, 2012

(86) PCT No.: PCT/US2012/043229
§ 371 (c)(1),
(2), (4) Date: Dec. 9, 2013

(87) PCT Pub. No.: WO2013/006270
PCT Pub. Date: Jan. 10, 2013

(65) Prior Publication Data
US 2014/0103913 A1    Apr. 17, 2014

(30) Foreign Application Priority Data
Jul. 1, 2011  (DE) .................. 10 2011 106 189

(51) Int. Cl.
G01B 7/00      (2006.01)
G01D 11/24     (2006.01)
G01D 11/30     (2006.01)
G01D 5/12      (2006.01)
G01D 5/14      (2006.01)

(52) U.S. Cl.
CPC  *G01B 7/00* (2013.01); *G01D 5/12* (2013.01); *G01D 11/245* (2013.01); *G01D 11/30* (2013.01); *G01D 5/145* (2013.01)

(58) Field of Classification Search
CPC .......... G01B 7/00; G01D 11/245; G01P 1/02

USPC .................. 324/207.11; 73/493, 866.5
See application file for complete search history.

(56) References Cited

U.S. PATENT DOCUMENTS 5,097,841 A *  3/1992 Moriuchi ............. A61B 5/0215
                                                            600/488
7,467,552 B2* 12/2008 MacGugan ............. B81B 7/007
                                                            73/493

(Continued)

FOREIGN PATENT DOCUMENTS

EP       1785392 A2    5/2007
KR     10-0687787 B1   2/2007
WO    2010-086360 A1   8/2010

OTHER PUBLICATIONS

International Search Report and Written Opinion of the International Searching Authority dated Jan. 31, 2013.

*Primary Examiner* — Christ Mahoney
(74) *Attorney, Agent, or Firm* — A. Michael Tucker; Stephan A. Pendorf; Patent Central LLC

(57) ABSTRACT

A position sensor module (1) for control capsules (2), having a base carrier (3) which base carrier (3) has a first receiving space (4) in which is arranged a sensor chip (5) and a second receiving space (6) in which is arranged a plug contact strip (7) of a plug contact arrangement (8) which is connected to chip contacts (9) of the sensor chip (5), and a cover part (10) which covers the first receiving space (4) and the second receiving space (6). The cover part leaves open an access opening (11) to the plug contact strip (7), and fixes the sensor chip (5) and the plug contact arrangement (8) to the base carrier (3).

14 Claims, 9 Drawing Sheets

(56) References Cited

U.S. PATENT DOCUMENTS

| | | | |
|---|---|---|---|
| 8,100,010 B2* | 1/2012 | Fly | G01C 19/5719 73/493 |
| 2007/0101812 A1 | 5/2007 | MacGugan | |
| 2010/0097059 A1* | 4/2010 | Estrada | G01R 33/0005 324/251 |
| 2011/0050222 A1 | 3/2011 | Ueno et al. | |
| 2012/0025810 A1* | 2/2012 | Uhlenbruck | F16H 59/044 324/207.2 |
| 2012/0038350 A1 | 2/2012 | Bender et al. | |
| 2012/0319708 A1* | 12/2012 | Orrico | G01D 5/04 324/705 |
| 2014/0165727 A1* | 6/2014 | Mueller | G01D 11/245 73/514.39 |

* cited by examiner

POSITION SENSOR MODULE

The invention relates to a position sensor module for control capsules as per claim 1.

It is thus the object of the present invention to provide a position sensor module which is suitable both for positive pressure capsules and also for negative pressure capsules, which has a simple design and which is suitable for use with different control capsule designs.

Said object is achieved by means of the features of claim 1.

Modular contactless position detection for pneumatic control capsules is realized with the position sensor module according to the invention. The construction of the module can be used both for positive pressure capsules and also for negative pressure capsules.

It is particularly advantageously possible for the position sensor module according to the present invention not to be installed in the space, which is charged with pressure or vacuum, of the control capsule. Said position sensor module can in fact optionally additionally be mounted on control capsules with a metallic, non-magnet cover at the outside by means of a holding device.

If a so-called 3D Hall chip is particularly advantageously used as a sensor chip, there is the resulting advantage that the magnet required for position determination need no longer be guided in the interior of the control capsule, because the 3D Hall chip means that the guidance of the magnet is no longer imperatively necessary. Directed installation is hereby eliminated.

The subclaims relate to advantageous refinements of the invention.

Further details, features and advantages of the invention will emerge from the following description of exemplary embodiments on the basis of the drawing, in which.

An embodiment of a position sensor module 1 will be described below on the basis of FIG. 1A and FIG. 1B.

Figure 1B:
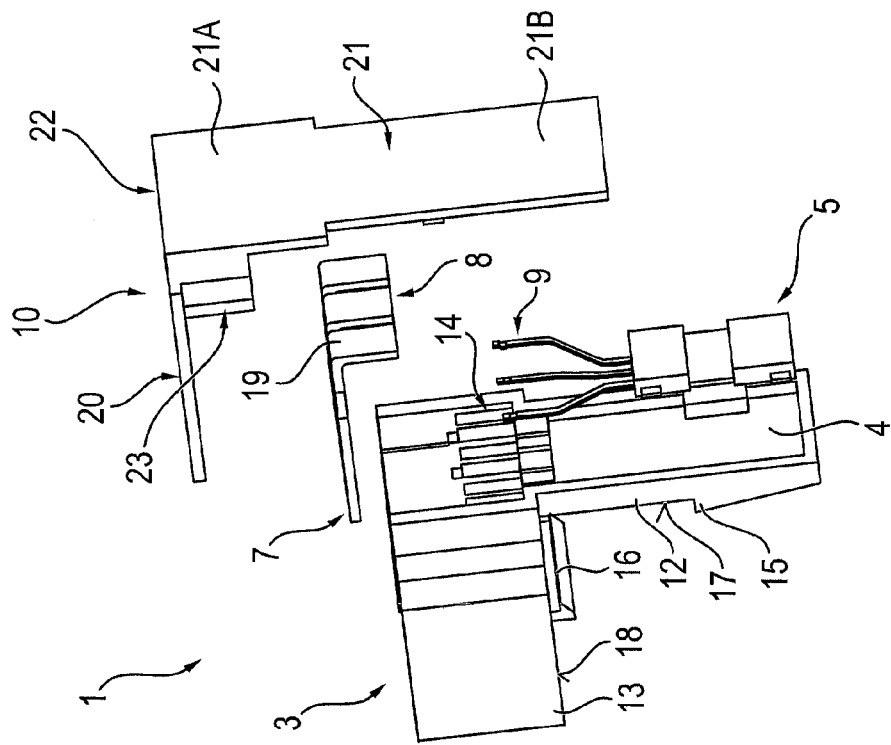
FIG. 1A and FIG. 1B show an exploded perspective illustration of the basic components of the position sensor module according to the invention.
Figure 1A:
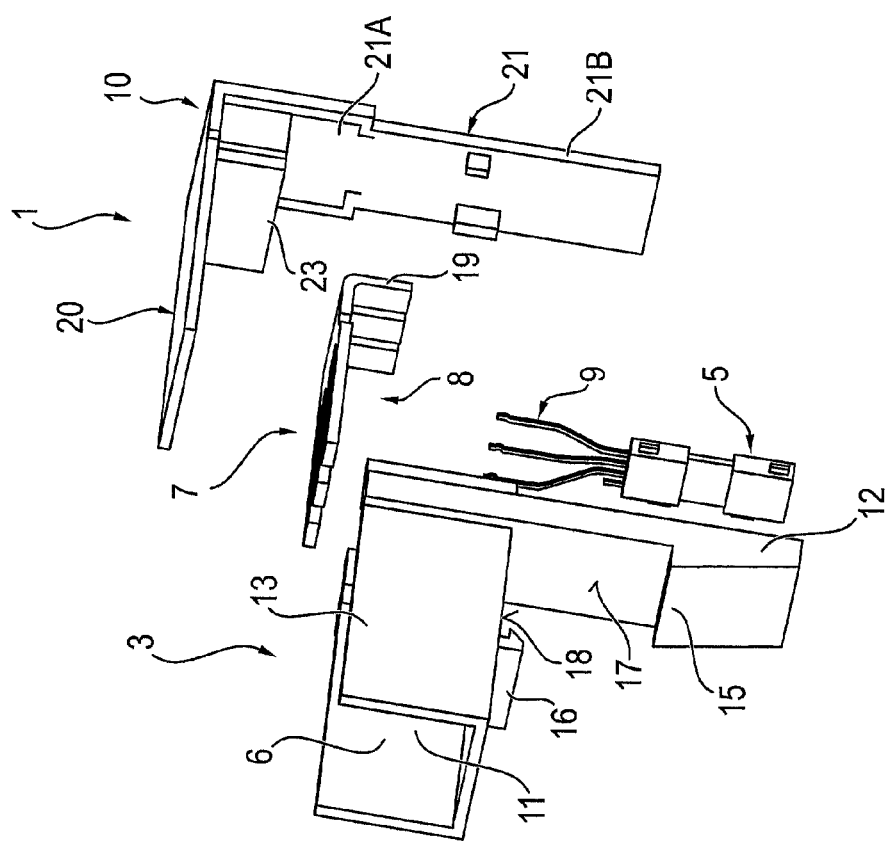

As can be seen from FIGS. 1A and 1B, the position sensor module 1 comprises a base carrier 3 and a cover part 10. The base carrier 3 has a first receiving space 4 in which is arranged a sensor chip 5 and has a second receiving space 6 in which is arranged a plug contact strip 7 of a plug contact arrangement 8.

As can also be seen from FIGS. 1A and 1B, the base carrier 3 is of L-shaped construction and the first receiving space 4 is arranged in a first carrier leg 12 and the second receiving space 6 is arranged in a second carrier leg 13.

The second carrier leg 13 is arranged at least substantially perpendicular to the first carrier leg 12. Furthermore, the base carrier 3 has a guide arrangement 14 which receives and guides the chip contacts 9. The base carrier 3 also has a support portion 15 which is arranged so as to project from a leg surface 17 of the carrier leg 12 and a support portion 16 which is arranged so as to project from a leg surface 18 of the carrier leg 13. The leg surfaces 17, 18 are arranged adjacent to one another and point in a direction away from the associated receiving spaces 4 and 6.

The plug contact arrangement 8 is of L-shaped construction and has a chip contact strip 19 which is arranged at least approximately perpendicular to the plug contact strip 7. The plug contact arrangement 8, when in the mounted state (see FIG. 2B), is connected via the chip contact strip 19 to the chip contacts 9 of the sensor chip 5 which is preferably in the form of a 3D Hall chip.

The cover part 10 is of L-shaped construction correspondingly to the base carrier 3 and has two cover legs 20, 21 which are arranged at least substantially perpendicular to one another. Here, the cover leg 20 has leg regions 21A and 21B formed such that, when the position sensor module 1 is in the mounted state, the first receiving space 4 together with the guide regions 14 is covered by the carrier leg 12. Here, the cover leg 21 covers the second receiving space 6, wherein an access opening 11 to the plug contact strip 7 is not covered or remains open.

In a connecting region 22 of the cover legs 20, 21, a holding part 23 is arranged on the cover legs 20, 21 at the inside, which holding part fixes or positions the plug contact arrangement 8, and the sensor chip 5 connected thereto, on the base carrier 3 in the mounted state. The base carrier 3 and the cover part 10 are connected to one another preferably by means of a snap-action/latching connection. Alternatively, the base carrier 3 and the cover part 10 may also be connected to one another by means of a screw connection, adhesive connection or welded connection.

Figure 2A:
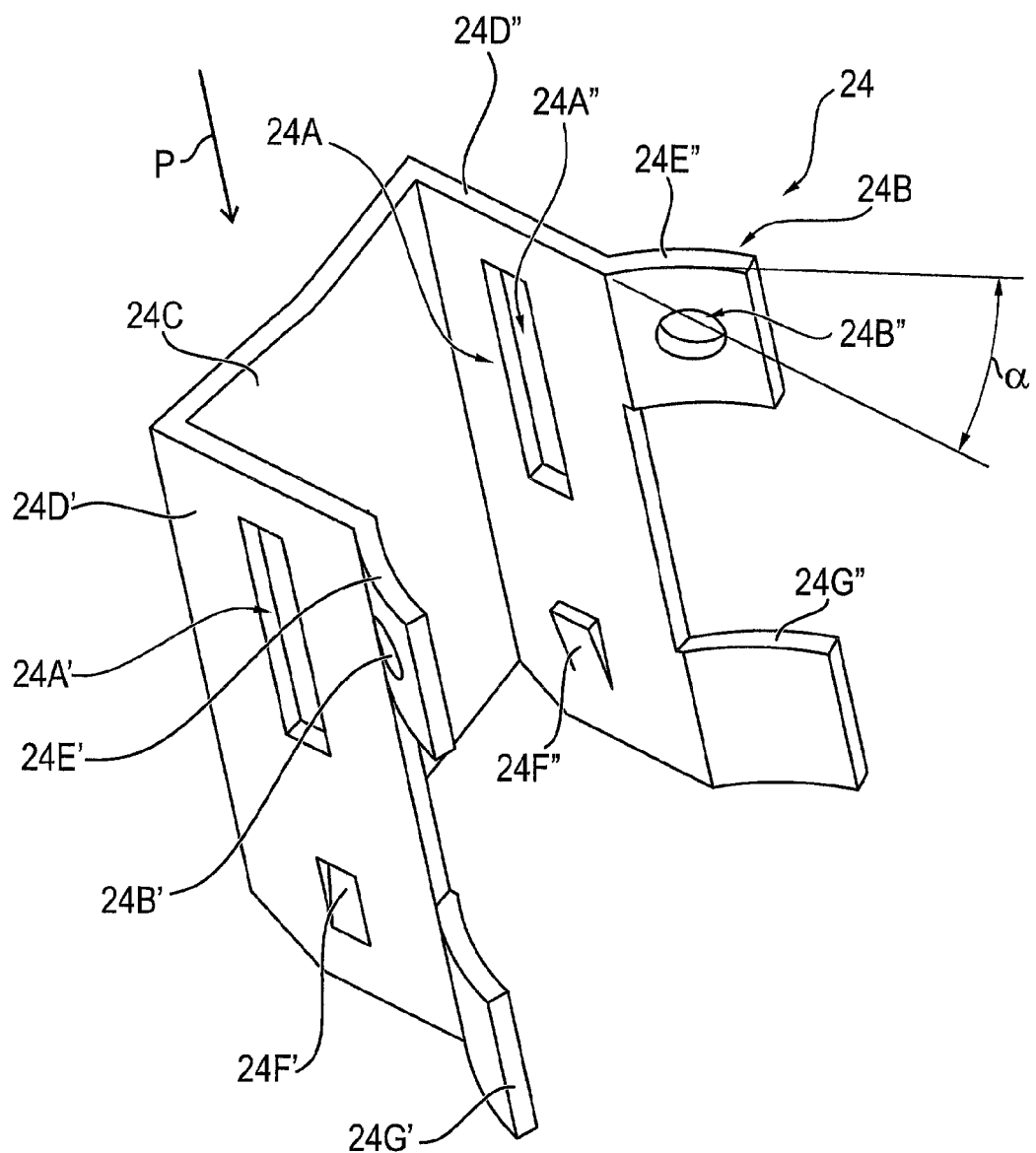
FIG. 2A and FIG. 2B show a first embodiment of a holding clip for the module according to the invention, illustrated on its own (FIG. 2A) and mounted on a control capsule cover (FIG. 2B)

To fix the position sensor module 1 in a control capsule 2 (cf. FIG. 2B), a holding clip 24 as per a first embodiment illustrated in FIG. 2A is provided. Here, the holding clip 24 is of substantially U-shaped form and has a rear wall 24C from which, at both sides, there extends a first fastening region 24A for holding the module 1, said first fastening region having side walls 24D', 24D" which run substantially perpendicular and in which is formed in each case one latching slot 24A' and 24A" of rectangular form and a wedge-shaped stop 24F' and 24F". On each side wall 24D', 24D" there is arranged a second fastening region 24B with a first lug 24E' and 24E" in which is formed in each case one circular recess 24B' and 24B'. Furthermore, in each case one second lug 24G' and 24G" is provided at the second fastening region 24B. The first and second lugs 24B', 24B", 24G' and 24G" are in each case of substantially rectangular form with an arched surface and are arranged in each case so as to open outwards at an angle α in relation to the first and second lugs 24B', 24B", 24G' and 24G".

Figure 2B:
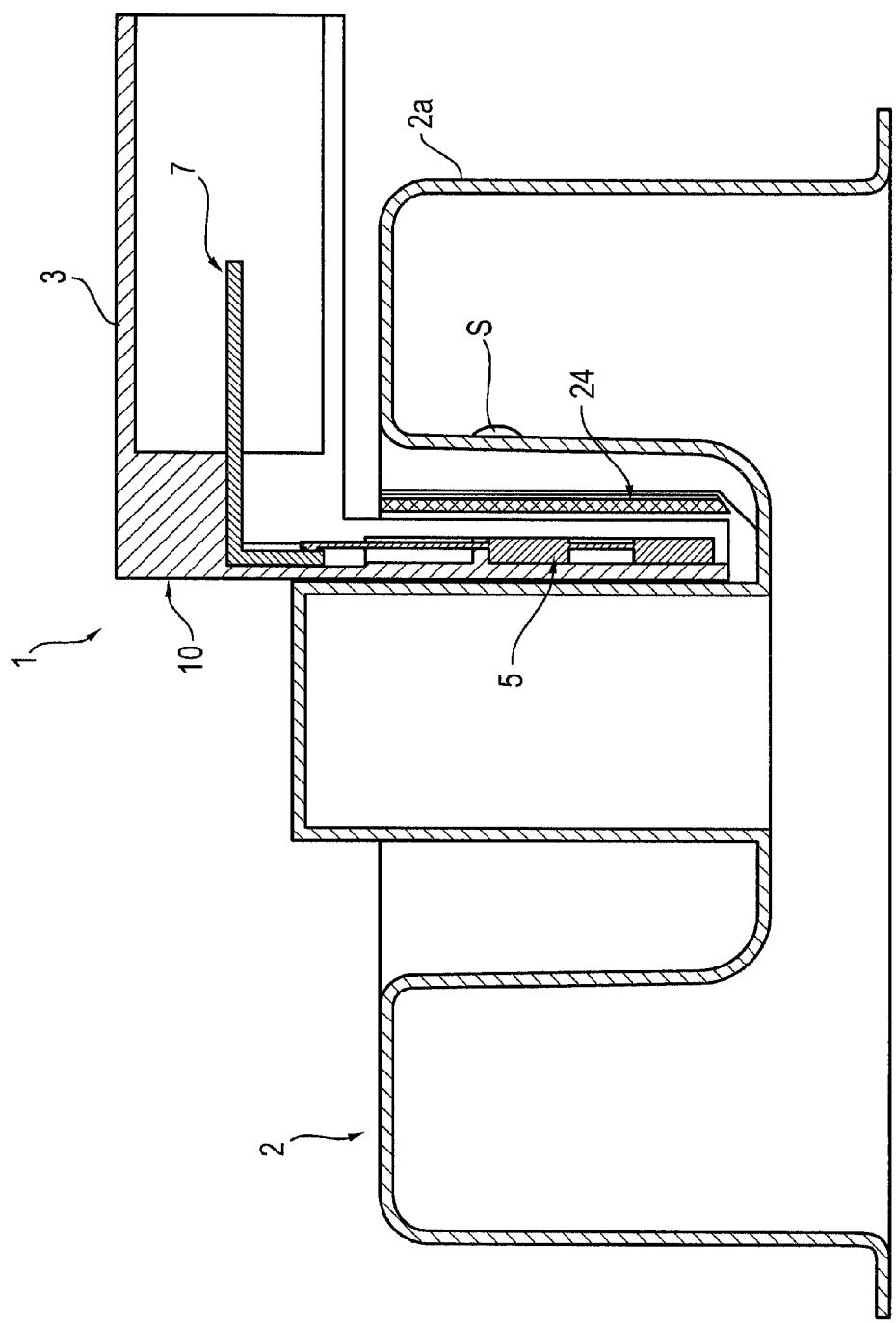

The position sensor module 1 is, for fastening, pushed into the holding clip 24 in the direction of an arrow P as far as the stops 24F', 24F", and is latched to said holding clip by means of the latching slots 24A', 24A". The circular recesses 24B', 24B" serve preferably for forming weld points by means of which the holding clip 24, as shown in FIG. 2B, is supported on or fastened to a wall 2a of a cover 2b of the control capsule 2. The holding clip 24 is formed preferably as a sheet-metal part.

A second preferred embodiment of a holding clip 25 for the position sensor module 1 will be described below with reference to FIGS. 3A and 3B.

Figure 3A:
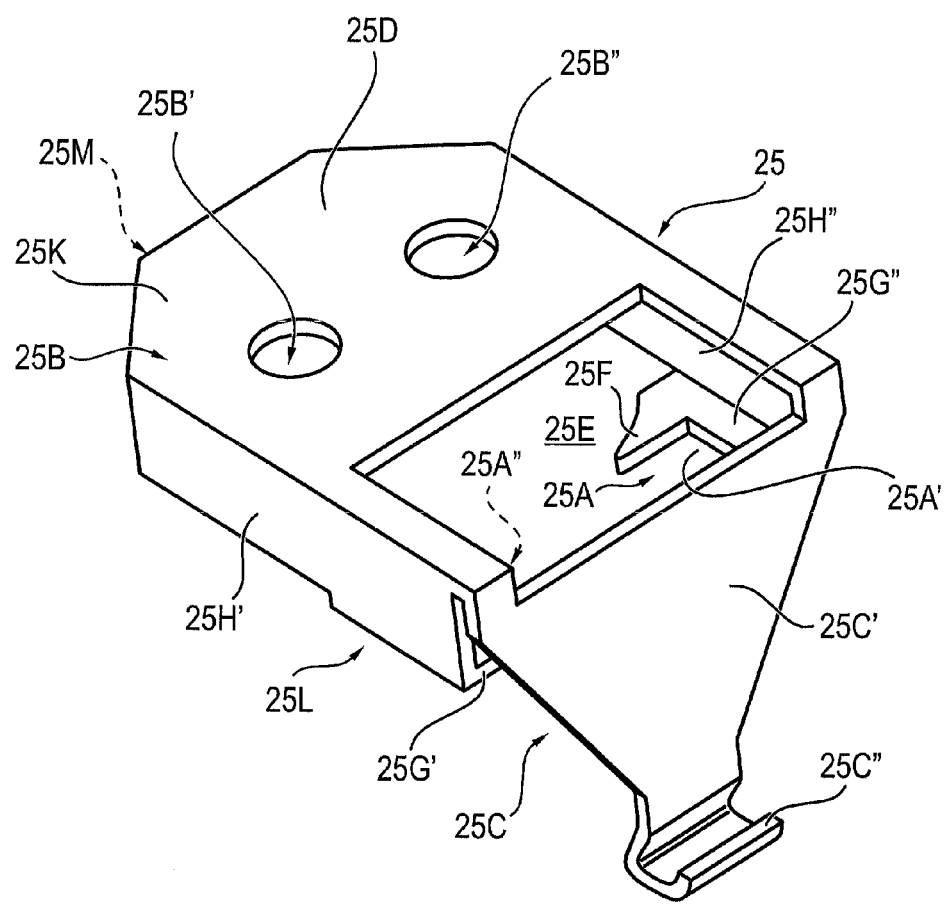
FIG. 3A and FIG. 3B show illustrations, corresponding to FIGS. 2A and 2B, of a second embodiment of the holding clip according to the invention.
Figure 3B:
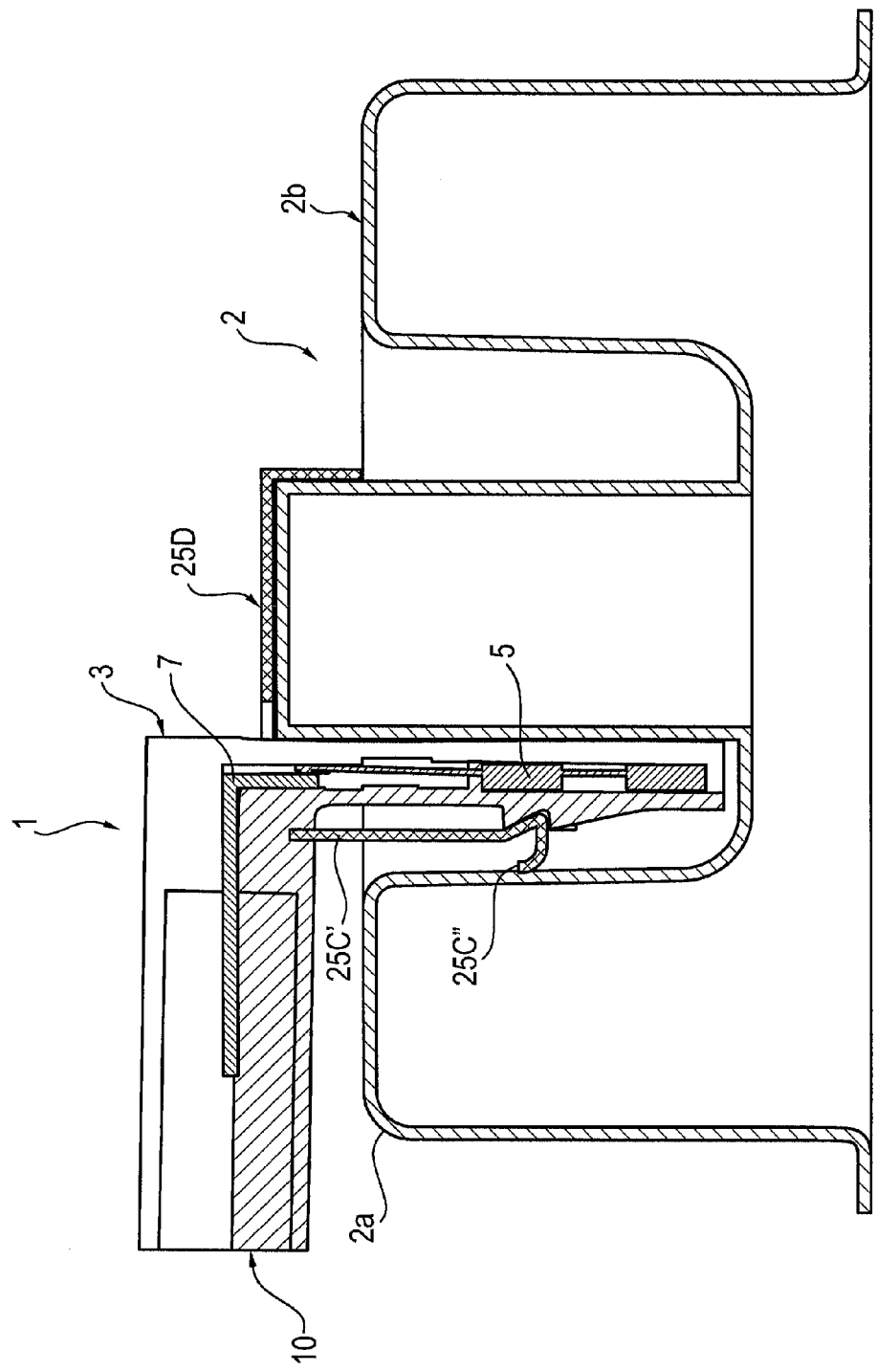

As can be seen from FIG. 3A, the holding clip 25 has a first fastening region 25A, a second fastening region 25B and a support portion 25C. The second fastening region 25B has two parallel side walls 25H', 25H" which are connected to one another in sections by means of a base plate 25D in which are formed two circular recesses 25B' and 25B" for forming weld points by means of which the holding clip 25 is fastened to the control capsule 2. Here, a trapezoidal end portion 25K of the base plate 25D projects beyond the side walls 25H', 25H" and has an end plate 25M (see FIG. 4A) which is arranged perpendicular and which is not visible here. On those end regions 25L of the side walls 25H', 25H" of the second fastening region 25B which are not connected to the base plate 25D there are provided support walls 25G', 25G" which are arranged substantially perpendicular to said fastening region and which form the first fastening region 25A. On the support walls 25G', 25G" there is arranged in each case one conically tapering tongue 25F which extends perpendicular and which projects into an insertion opening 25E and forms two latching slots 25A' and 25A", of which only the latching slot 25A' is visible in FIG. 3A. During mounting, the position sensor module 1 is pushed in from above (the side of the base plate 25D) and is latched by means of the latching slots 25A', 25A". On that end of the second fastening region 25B which is situated opposite the base plate 25D, the support portion 25C is arranged substantially perpendicular, said support portion having a support wall 25C' which is of trapezoidal form and which has a hook-shaped end portion 25C". By means of the end portion 25C", the holding clip 25 is supported, as shown in FIG. 3B, against the wall 2a of the cover 2b of the control capsule 2 when the position sensor module 1 is in the mounted state.

Figure 4A:
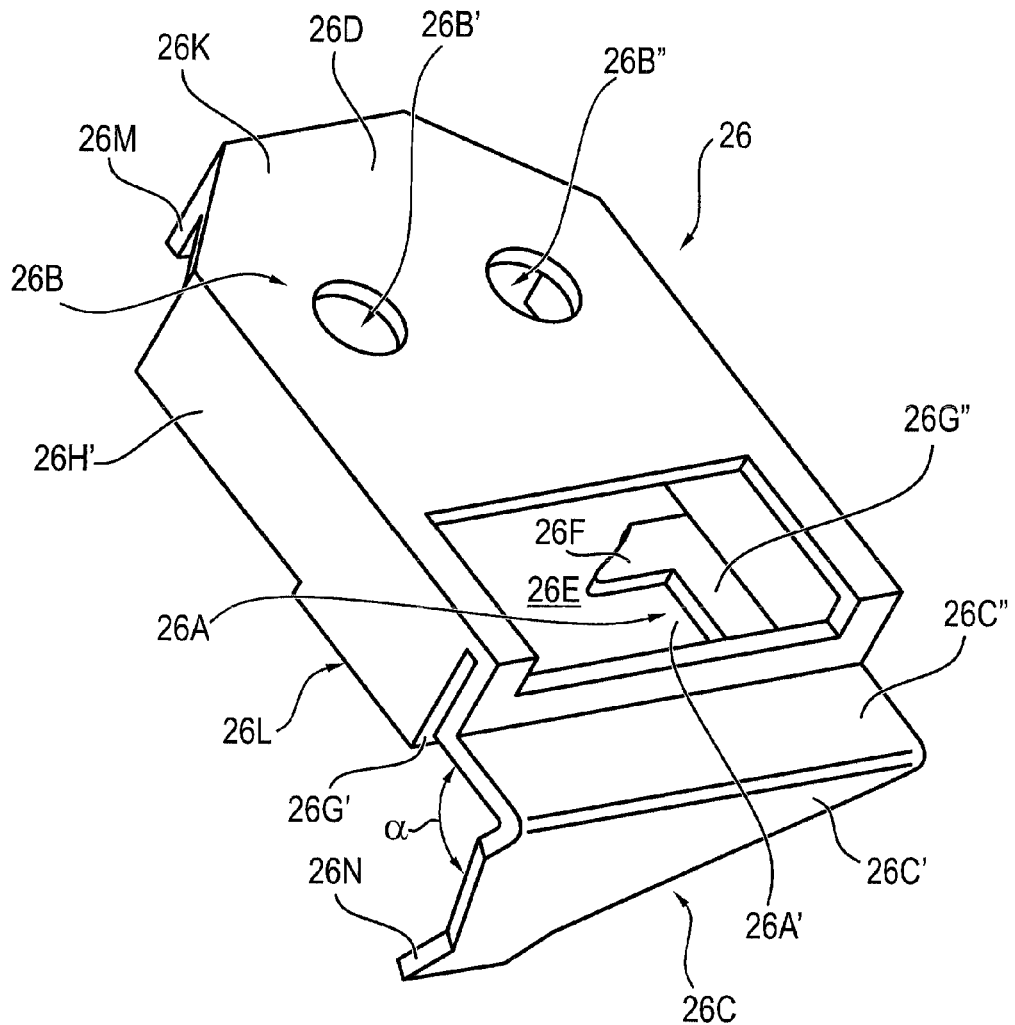
FIG. 4A and FIG. 4B show illustrations, corresponding to FIGS. 2A and 2B, of a third embodiment of the holding clip according to the invention.
Figure 4B:
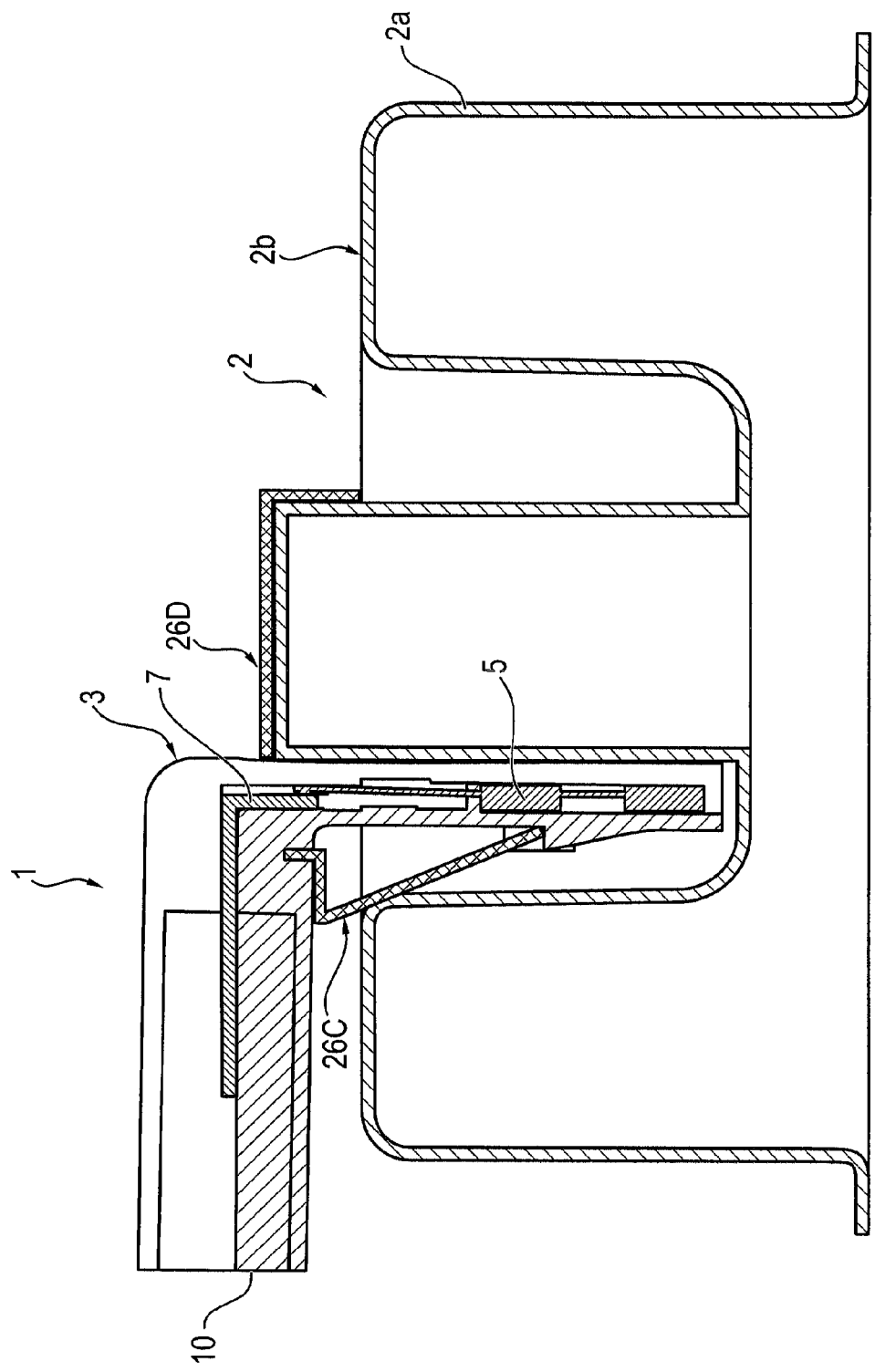

A third preferred embodiment of a holding clip 26 for the position sensor module 1 will be described below with reference to FIGS. 4A and 4B. Aside from the support portion 26C to be described below, all other features correspond to those of the second embodiment, such that reference may be made to the above description thereof, wherein the reference symbols are prefixed in each case with the number "26".

In contrast to the holding clip 25 described above, the holding clip 26 has a support portion 26C with a central portion 26C" which projects out perpendicularly and which is of substantially rectangular form. The central portion 26C" is adjoined by a trapezoidal support wall 26C' with a substantially rectangular end portion 26N, said support wall being arranged at an acute angle a with respect to the central portion 26C". Here, the angle α is dimensioned such that the holding clip 26, as shown in FIG. 4B, can in the mounted state latch with the support portion 26C onto the position sensor module 1 and support the latter against the wall 2a of the cover 2b of the control capsule 2.

Figure 5A:
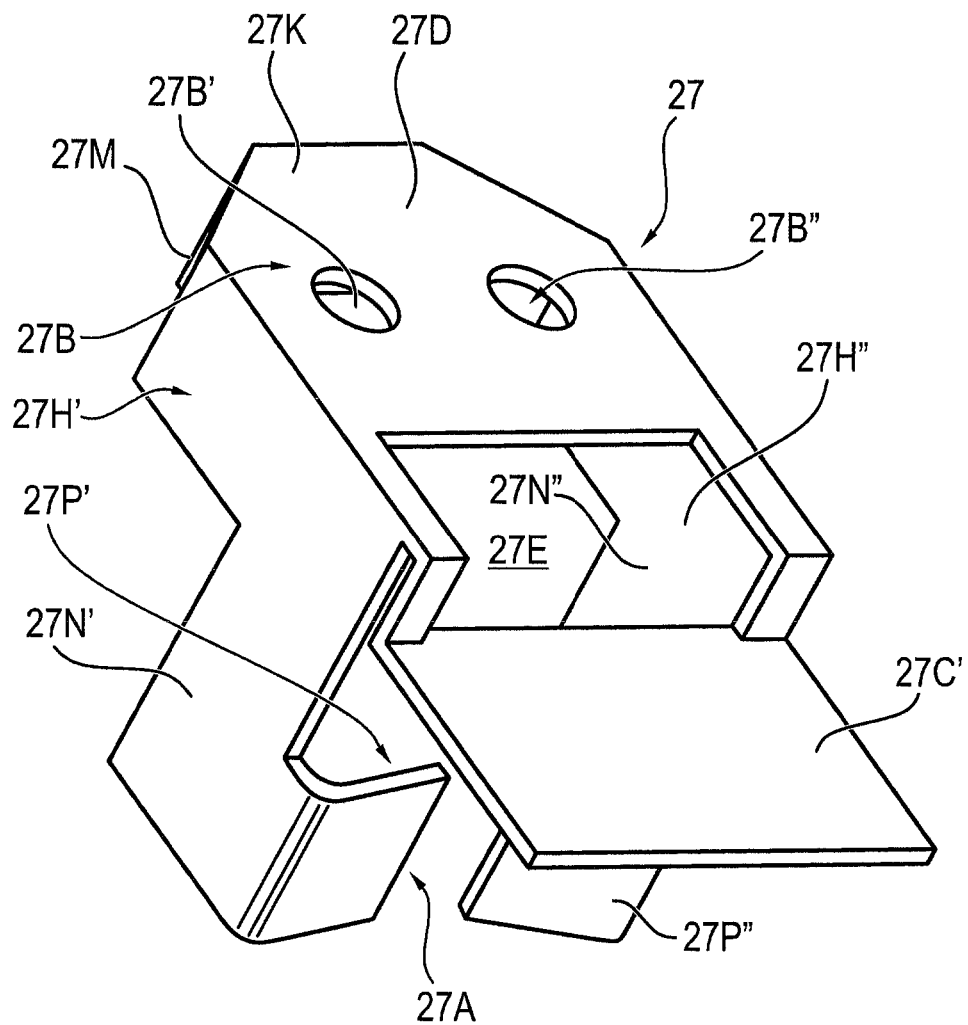
FIG. 5A and FIG. 5B show illustrations, corresponding to FIGS. 2A and 2B, of a fourth embodiment of the holding clip according to the invention.
Figure 5B:
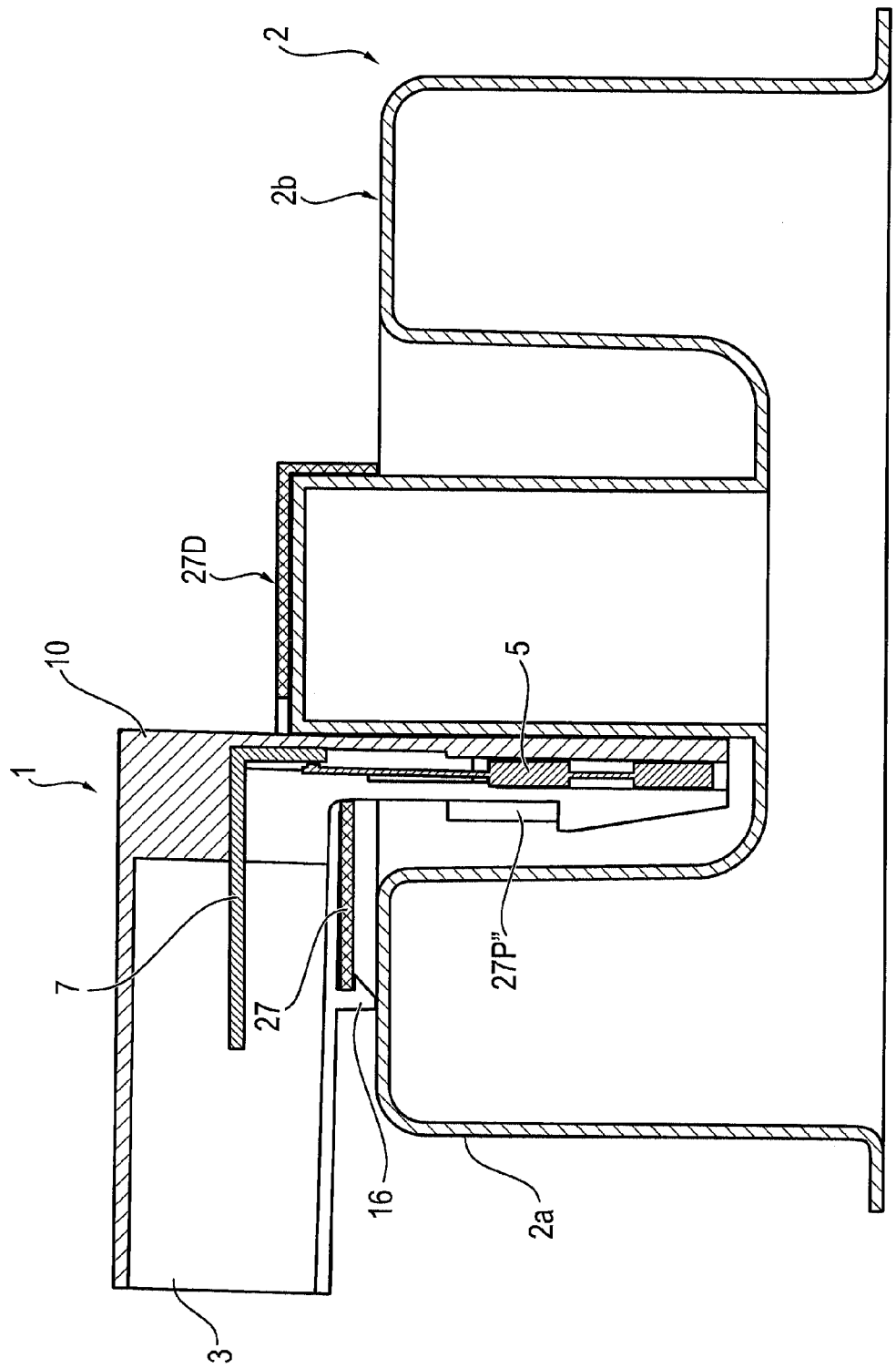

A fourth preferred embodiment of a holding clip 27 for the position sensor module 1 will be described below with reference to FIGS. 5A and 5B. Aside from the support portion 27C to be described below, all other features correspond to those of the second and third embodiments, such that reference may be made to the above description thereof, wherein the reference symbols are prefixed in each case with the number "27".

In contrast to the holding clip 26 described above, the holding clip 27 has a support portion 27C' which is of rectangular form and which projects out perpendicularly. Furthermore, side walls 27H' and 27H" are provided with perpendicularly elongated end portions 27N' and 27N" which have laterally projecting, bent, resiliently elastic holding ends 27P' and 27P" which form a first fastening region 27A'. As can be seen from FIG. 5B, the position sensor module 1 mounted in the holding clip 27 is positioned by the holding ends 27P', 27P" by means of the resilient action thereof, wherein the base carrier 3 rests on the support portion 27C' and is latched to the latter by means of the support portion 16 of the base carrier 3.

To supplement the disclosure of the invention, reference is hereby explicitly made to the diagrammatic illustration thereof in FIGS. 1A to 5B.

LIST OF REFERENCE SYMBOLS

1 Position sensor module
2 Control capsule
2b Cover wall
3 Base carrier
4 First receiving space
5 Sensor chip
6 Second receiving space
7 Plug contact strip
8 Plug contact arrangement
9 Chip contacts
10 Cover part
11 Access opening
12 First carrier leg
13 Second carrier leg
14 Guide arrangement
15, 16 Support portions
17, 18 Leg surfaces
19 Chip contact strip
20, 21 Cover leg
22 Connecting region
23 Holding part
24 Holding clip (first embodiment)
24A First fastening region
24A', 24A" Latching slots
24B Second fastening region
24B', 24B" Recesses
24C Rear wall
24D', 24D" Side walls
24E', 24E" First lugs
24F', 24F" Stops
24G', 24G" Second lugs
25 Holding clip (second embodiment)
25A First fastening region
25A' Latching slot
25B Second fastening region
25B', 25B" Recesses
25C Support portion
25C' Support wall
25C" Hook-shaped end portion of the support wall
25D Base plate
25E Insertion opening
25F Tongue
25G', 25G" Support wall
25H', 25H" Side walls
25K End portion
25L End region
25M End plate
26 Holding clip (third embodiment)
26A First fastening region
26A' Latching slot
26B Second fastening region
26C Support portion
26C' Support wall
26C" Central portion
26D Base plate
26E Insertion opening
26F Tongue
26G', 26G" Support wall
26H', 26H" Side walls
26K End portion
26L End region 26M End plate
26N End portion
27 Holding clip (fourth embodiment)
27A First fastening region
27C' Support portion
27D Base plate
27E Insertion opening
27H', 27H" Side walls
27K End portion
27M End plate
27N', 27N" End portion
27P', 27P" Resiliently elastic holding ends

The invention claimed is:

1. A position sensor module (1) for control capsules (2), having
a base carrier (3) with
a first receiving space (4) in which is arranged a sensor chip (5) and
a second receiving space (6) in which is arranged a plug contact strip (7) of a plug contact arrangement (8) which is connected to chip contacts (9) of the sensor chip (5), and
a cover part (10)
which covers the first receiving space (4) and the second receiving space (6), wherein said cover part leaves open an access opening (11) to the plug contact strip (7), and
which fixes the sensor chip (5) and the plug contact arrangement (8) to the base carrier (3),
wherein the cover part (10) is L-shaped correspondingly to the base carrier (3) and has two cover legs (20, 21) which are arranged at least substantially perpendicular to one another and which cover the receiving spaces (4, 6).

2. The position sensor module as claimed in claim 1, wherein, in a connecting region (22) of the cover legs (20, 21), a holding part (23) is arranged on the cover legs (20, 21) at the inside, which holding part fixes the plug contact arrangement (8) to the base carrier (3).

3. The position sensor module as claimed in claim 1, wherein the base carrier (3) and the cover part (10) are connected to one another by means of a suitable connecting device.

4. The position sensor module as claimed in claim 3, wherein the base carrier (3) and the cover part (10) are connected to one another by means of a snap-action/latching connection, a screw connection, an adhesive connection or a welded connection.

5. The position sensor module as claimed in claim 1, wherein the sensor chip (5) is a 3D Hall chip.

6. A position sensor module (1) for control capsules (2), having
a base carrier (3) with
a first receiving space (4) in which is arranged a sensor chip (5) and
a second receiving space (6) in which is arranged a plug contact strip (7) of a plug contact arrangement (8) which is connected to chip contacts (9) of the sensor chip (5), and
a cover part (10)
which covers the first receiving space (4) and the second receiving space (6), wherein said cover part leaves open an access opening (11) to the plug contact strip (7), and
which fixes the sensor chip (5) and the plug contact arrangement (8) to the base carrier (3),
wherein the base carrier (3) has a guide arrangement (14) which receives and guides the chip contacts (9).

7. A position sensor module (1) for control capsules (2), having
a base carrier (3) with
a first receiving space (4) in which is arranged a sensor chip (5) and
a second receiving space (6) in which is arranged a plug contact strip (7) of a plug contact arrangement (8) which is connected to chip contacts (9) of the sensor chip (5), and
a cover part (10)
which covers the first receiving space (4) and the second receiving space (6), wherein said cover part leaves open an access opening (11) to the plug contact strip (7), and
which fixes the sensor chip (5) and the plug contact arrangement (8) to the base carrier (3),
wherein the base carrier (3) is L-shaped and the first receiving space (4) is arranged in a first carrier leg (12) and the second receiving space (6) is arranged in a second carrier leg (13) which is arranged at least substantially perpendicular to the first carrier leg (12), and
wherein the base carrier (3) has support portions (15, 16) which are arranged on the carrier legs (12, 13) and which project from associated leg surfaces (17, 18) and which are arranged adjacent to one another.

8. A position sensor module (1) for control capsules (2), having
a base carrier (3) with
a first receiving space (4) in which is arranged a sensor chip (5) and
a second receiving space (6) in which is arranged a plug contact strip (7) of a plug contact arrangement (8) which is connected to chip contacts (9) of the sensor chip (5), and
a cover part (10)
which covers the first receiving space (4) and the second receiving space (6), wherein said cover part leaves open an access opening (11) to the plug contact strip (7), and
which fixes the sensor chip (5) and the plug contact arrangement (8) to the base carrier (3),
wherein the plug contact arrangement (8) is L-shaped and has a chip contact strip (19) which is arranged at least approximately perpendicular to the plug contact strip (7).

9. A position sensor module (1) for control capsules (2), having
a base carrier (3) with
first receiving space (4) in which is arranged a sensor chip (5) and
a second receiving space (6) in which is arranged a plug contact strip (7) of a plug contact arrangement (8) which is connected to chip contacts (9) of the sensor chip (5), and
a cover part (10)
which covers the first receiving space (4) and the second receiving space (6), wherein said cover part leaves open an access opening (11) to the plug contact strip (7), and
which fixes the sensor chip (5) and the plug contact arrangement (8) to the base carrier (3),
further comprising a holding clip (24; 25; 26; 27) which has a first fastening region (24A; 25A; 26A; 27A) for holding the module (1) and a second fastening region (24B; 25B; 26B; 27B) for fixing to the control capsule (2).

10. The position sensor module as claimed in claim 9, wherein the first fastening region (24A; 25A; 26A) has latching slots (24A', 24A"; 25A', 25A"; 26A', 26A").

11. The position sensor module as claimed in claim 9, wherein the first fastening region (27A) has resiliently elastic holding ends (27A', 27A").

12. The position sensor module as claimed in claim 9, wherein the second fastening region (24B; 25B; 26B; 27B) has recesses (24B', 24B"; 25B', 25B"; 26B', 26B"; 27B', 27B"), preferably for forming weld points.

13. The position sensor module as claimed in claim 9, wherein the holding clip (25; 26) has a support portion (25C; 26C) for support against a wall (2*a*) of a cover (2*b*) of the control capsule (2).

14. The position sensor module as claimed in claim 9, wherein the holding clip (24; 25; 26; 27) is a sheet-metal part.

* * * * *